United States Patent
DiMaria et al.

(10) Patent No.: US 11,665,283 B2
(45) Date of Patent: *May 30, 2023

(54) SYSTEM AND METHOD FOR MOBILE DEVICE ACTIVE CALLBACK INTEGRATION

(71) Applicant: Virtual Hold Technology Solutions, LLC, Akron, OH (US)

(72) Inventors: Matthew DiMaria, Brentwood, TN (US); Shannon Lekas, Cushing, TX (US); Kurt Nelson, Thompsons Station, OH (US); Nicholas James Kennedy, Akron, OH (US); Brian R. Galvin, Silverdale, WA (US); Daniel Bohannon, Livermore, CA (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,392

(22) Filed: Nov. 15, 2022

(65) Prior Publication Data

US 2023/0060552 A1 Mar. 2, 2023

Related U.S. Application Data

(63) Continuation-in-part of application No. 16/985,093, filed on Aug. 4, 2020, now Pat. No. 11,503,160, which is a continuation of application No. 16/583,967, filed on Sep. 26, 2019, now Pat. No. 10,735,589, which is a continuation-in-part of (Continued)

(51) Int. Cl.
| | |
|---|---|
| H04M 3/523 | (2006.01) |
| H04M 3/51 | (2006.01) |
| H04W 4/16 | (2009.01) |
| H04L 47/6275 | (2022.01) |
| H04L 67/60 | (2022.01) |
| H04L 45/02 | (2022.01) |

(52) U.S. Cl.
CPC ...... *H04M 3/5231* (2013.01); *H04L 47/6275* (2013.01); *H04L 67/60* (2022.05); *H04M 3/5191* (2013.01); *H04W 4/16* (2013.01); *H04L 45/08* (2013.01)

(58) Field of Classification Search
None
See application file for complete search history.

(56) References Cited

U.S. PATENT DOCUMENTS 7,016,847 B1 * 3/2006 Tessel ............... G10L 15/30
704/E15.04
2007/0238451 A1 * 10/2007 Borzsei ............ H04M 1/663
455/418

(Continued)

*Primary Examiner* — Quynh H Nguyen
(74) *Attorney, Agent, or Firm* — Galvin Patent Law LLC; Brian R. Galvin

(57) ABSTRACT

A system and method for mobile device active callback integration, utilizing a callback integration engine operating on a user's mobile device that present a callback token for integration through the operating system and software applications operating on the device, wherein interacting with the callback token produces a callback object used to execute a callback incorporating device hardware, context, scheduling, and trust information.

14 Claims, 17 Drawing Sheets

Related U.S. Application Data application No. 16/542,577, filed on Aug. 16, 2019, now Pat. No. 10,609,218.

(60) Provisional application No. 62/828,133, filed on Apr. 2, 2019, provisional application No. 62/820,190, filed on Mar. 18, 2019.

(56) References Cited

U.S. PATENT DOCUMENTS

| | | |
|---|---|---|
| 2016/0050320 A1 | 2/2016 | Montenegro et al. |
| 2021/0144243 A1 | 5/2021 | Aroxa et al. |

* cited by examiner

SYSTEM AND METHOD FOR MOBILE DEVICE ACTIVE CALLBACK INTEGRATION

CROSS-REFERENCE TO RELATED APPLICATIONS

Priority is claimed in the application data sheet to the following patents or patent applications, the entire written description of each of which is expressly incorporated herein by reference in its entirety:

Ser. No. 17/895,651
Ser. No. 16/985,093
Ser. No. 16/583,967
62/828,133
Ser. No. 16/542,577
62/820,190

BACKGROUND OF THE INVENTION

Field of the Art

The disclosure relates to the field of mobile device technology, specifically to the field of integrating cloud-based callback management systems with onboard software on a mobile device.

Discussion of the State of the Art

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are frustrating to clients. It takes significant time to navigate the layered menus of voice prompts.

Second, waiting on-hold while a connection, be it a phone call, web chat, video conference, or other interaction type, is maintained in queue for connection to a service agent is also frustrating to clients.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative less frustrating, it does not address the inconvenience of having to navigate a slow and complicated voice prompt menu to enter the queue.

What is needed is a system and various methods for providing integration of a callback cloud with mobile device software so that callback functionality becomes a transparent and consistent feature across interaction modes through the mobile device ecosystem.

SUMMARY OF THE INVENTION

Accordingly, the inventor has conceived and reduced to practice, in a preferred embodiment of the invention, a system and methods for mobile device active callback integration, utilizing a callback integration engine operating on a user's mobile device that present a callback token for integration through the operating system and software applications operating on the device, wherein interacting with the callback token produces a callback object used to execute a callback incorporating device hardware, context, scheduling, and trust information. The following non-limiting summary of the invention is provided for clarity, and should be construed consistently with embodiments described in the detailed description below.

A mobile device with active callback integration has been devised, comprising: a processor, a memory, and a plurality of programming instructions stored in the memory and operable on the processor; and a callback integration engine comprising a subset of the plurality of programming instructions that, when operating on the processor, cause the processor to: provide a callback token representing an interactive indicia configured for presentation throughout an operating system of the mobile device; receive interaction from a user via the callback token; produce a callback object, the callback object comprising information associated with the callback token; call a callback participant based on the callback object; present an incoming call prompt to the user; and connect the user and another device, when both the user and the callback participant answer their respective incoming call prompts.

A method for mobile device active callback integration has been devised, comprising the steps of: providing, using a callback integration engine operating on a computing device, a callback token representing an interactive indicia for presentation throughout a software operating system; receiving interaction from a user via the callback token; producing a callback object comprising information associated with the callback token; calling a callback participant based on the callback object; presenting an incoming call prompt to the user; and connecting the user and another device, when both the user and the callback participant answer their respective incoming call prompts.

A further mobile device with active callback integration has been devised, comprising: a processor, a memory, and a plurality of programming instructions stored in the memory and operable on the processor; and a callback integration engine comprising a subset of the plurality of programming instructions that, when operating on the processor, cause the processor to: receive an incoming call from a caller at the mobile device; produce a callback token; provide the incoming call and callback token to an operating system of the mobile device for presentation to a user as a first incoming call prompt; receive interaction from the user via the callback token; and transmit a notification to the caller, the notification comprising instructions for a callback.

According to an aspect of an embodiment, the callback integration engine is further configured to: receive a text message from a contact center, the text message comprising an appropriate time for a callback; and wherein the callback object is produced comprising the appropriate time for the callback.

According to an aspect of an embodiment, the callback integration engine is further configured to: receive a callback request from a social network application; and wherein the callback object is produced comprising information retrieved from a social network server.

According to an aspect of an embodiment, the callback integration engine is further configured to: receive, from an adaptive cloud conversation platform, a suggested callback message when a user of the mobile device abandons a call; and wherein the callback object is produced comprising information associated with the suggested callback message.

According to an aspect of an embodiment, the callback integration engine selects the callback participant based on trust information, the trust information comprising an indication of whether the callback participant is trusted by the user.

According to an aspect of an embodiment, the callback integration engine analyzes available information about the caller, and the callback token is produced based on the results of the analysis.

According to an aspect of an embodiment, the callback integration engine analyzes the user's calendar, and wherein the callback instructions are based on the results of the analysis.

According to an aspect of an embodiment, the callback integration engine analyzes hardware information of the computing device, and wherein the callback instructions are based on the results of the analysis.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
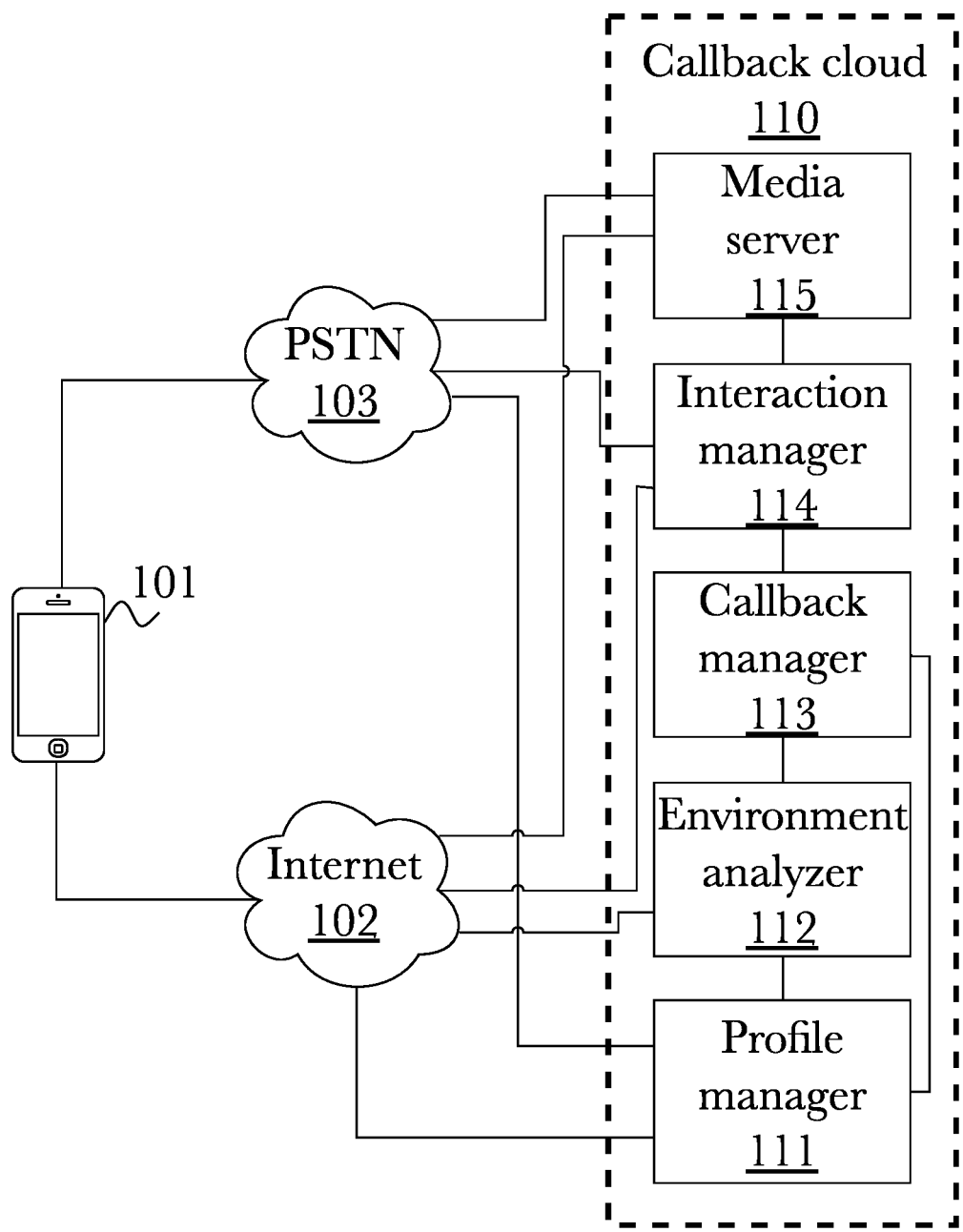
FIG. 1 is a block diagram illustrating an exemplary system architecture for a mobile device connected to a callback cloud via a public switch telephone network and the Internet, according to an embodiment.

The inventor has conceived, and reduced to practice, a system and method for intent-based active callback management.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to an instance of an individual being contacted after their initial contact was unsuccessful. For instance, if a first user calls a second user on a telephone, but the second user does not receive their call for one of numerous reasons including turning off their phone or simply not picking up, the second user may then place a callback to the first user once they realize they missed their call. This callback concept applies equally to many forms of interaction that need not be restricted to telephone calls, for example including (but not limited to) voice calls over a telephone line, video calls over a network connection, or live text-based chat such as web chat or short message service (SMS) texting. While a callback (and various associated components, methods, and operations taught herein) may also be used with an email communication despite the inherently asynchronous nature of email (participants may read and reply to emails at any time, and need not be interacting at the same time or while other participants are online or available), the preferred usage as taught herein refers to synchronous communication (that is, communication where participants are interacting at the same time, as with a phone call or chat conversation).

"Callback object" as used herein means a data object representing callback data, such as the identities and call information for a first and second user, the parameters for a callback including what time it shall be performed, and any other relevant data for a callback to be completed based on the data held by the callback object.

Conceptual Architecture

FIG. 1 is a block diagram illustrating an exemplary system architecture 100 for a mobile device 101 connected to a callback cloud 110 via a public switch telephone network 103 and the Internet 102, according to an embodiment. According to the embodiment, callback cloud 110 may receive requests via a plurality of communications networks such as a public switched telephone network (PSTN) 103 or the Internet 102. These requests may comprise a variety of communication and interaction types, for example including (but not limited to) voice calls over a telephone line, video calls over a network connection, or live text-based chat such as web chat or short message service (SMS) texting via PSTN 103. Such communications networks may be connected to a plurality of mobile devices 101 such as a user's smartphone or similar mobile device, according to the particular architecture of communication network involved. Mobile devices 101 may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 100 according to the invention.

When needed (for example, when a user manually requests a callback or when configured settings determine that a callback is needed), a user's mobile device 101 creates a session with a callback cloud 110 with a profile manager 111, resulting in a callback being required. Profile manager 111 receives initial requests to connect to callback cloud 110, and forwards relevant user profile information to a callback manager 113, which may further request environmental context data from an environment analyzer 112. Environmental context data may include (for example, and not limited to) recorded information about when a user may be suspected to be driving or commuting from work (as may be determined from device information, such as whether a "do not disturb while driving" feature has been enabled, or if the mobile device 101 is currently connected to a car audio system), or if the user may be busy for another reason, such as if they are running or working out (as may be determined from device sensor data), for example, and may be parsed from online profiles or online textual data, using an environment analyzer 112.

A callback manager 113 centrally manages all callback data, creating a callback object which may be used to manage the data for a particular callback, and communicates with an interaction manager 114 which handles requests to make calls and bridge calls, which go out to a media server 115 which actually makes the calls as requested. In this way, the media server 115 may be altered in the manner in which it makes and bridges calls when directed, but the callback manager 113 does not need to adjust itself, due to going through an intermediary component, the interaction manager 114, as an interface between the two. A media server 11'5, when directed, may place calls and send messages, emails, or connect voice over IP ("VoIP") calls and video calls, to users over a PSTN 103 or the Internet 102. Callback manager 113 may work with a user's profile as managed by a profile manager 111, with environmental context from an environment analyzer 112 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 114 to physically place and bridge the calls with a media server 115.

Figure 2:
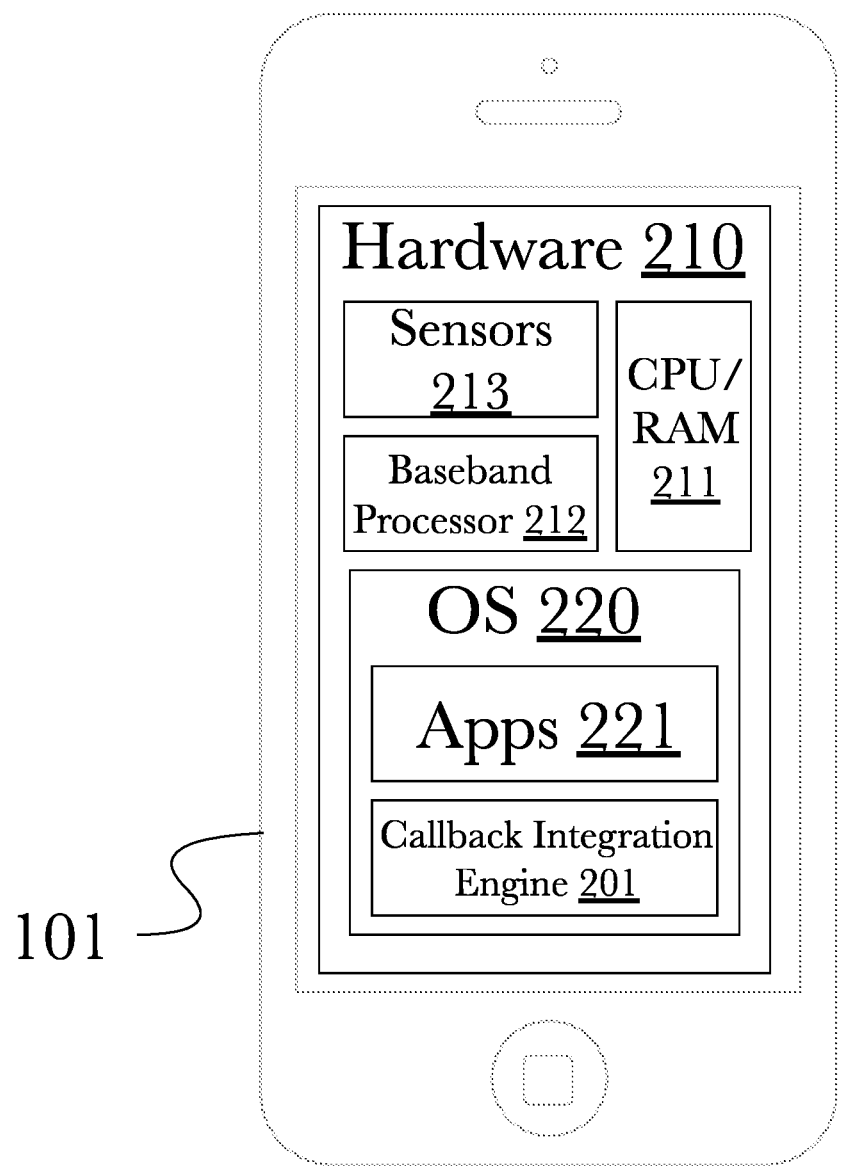
FIG. 2 is a block diagram illustrating an exemplary mobile device with a callback integration engine operating at the operating system level, according to an embodiment.

FIG. 2 is a block diagram illustrating an exemplary mobile device 101 with a callback integration engine 201 operating at the operating system level 230, according to an embodiment. According to the embodiment, a mobile device 101 comprises several hardware and software components operating at various levels to provide various functions. At the most basic hardware level 210, the physical hardware of the mobile device 101 may comprise a processor and memory 211 that provide standard computing device functionality as described in detail below, with reference to FIGS. 10-13 (grouped together here for the sake of clarity, it should be appreciated that processor/memory may or may not be part of the same hardware component, such as a system-on-a-chip), a baseband processor 212 that manages radio-based communication functions such as cellular or Wi-Fi connectivity, as well as any of a number of hardware sensors 213 such as (for example, including but not limited to) an accelerometer to detect or measure device movement, gyroscope for detecting or measuring device orientation, barometer for measuring ambient environment conditions, or global positioning system (GPS) receiver for geolocating the device.

An operating system (OS) 220 comprises the main software operating on mobile device 101 and providing various software-based functions such as software applications and communications. Various software applications 221 operating within (for example in an application layer not shown here but as is commonly used in various computing devices according to the standard OSI process model of computing systems) on the mobile device 101 may expose and provide access to, or interaction with, various hardware and sensor features such as to enable a user to view or calibrate sensor readings.

According to the embodiment, a callback integration engine 201 may comprise local (that is, operating on the mobile device) functionality similar to a cloud-based callback manager 113 described above, and may operate as an application or feature at the operating system level 220, running at a similar privilege level and having similar access to hardware and software functions as other applications 221 operating on mobile device 101. This enables easy installation or removal of callback integration engine 201, as it may be readily distributed via similar methods as any other software application (for example, via an application store or similar download portal). However, this may restrict the capabilities of callback integration engine 201, as it will have only indirect access to hardware features (as it will only be able to access whatever features are exposed by the operating system) and in many cases may be "sandboxed", and prevented from directly accessing other software or information on the mobile device 201 (for example, in a sandboxed software environment such as APPLE IOS™ or similar).

Figure 3:
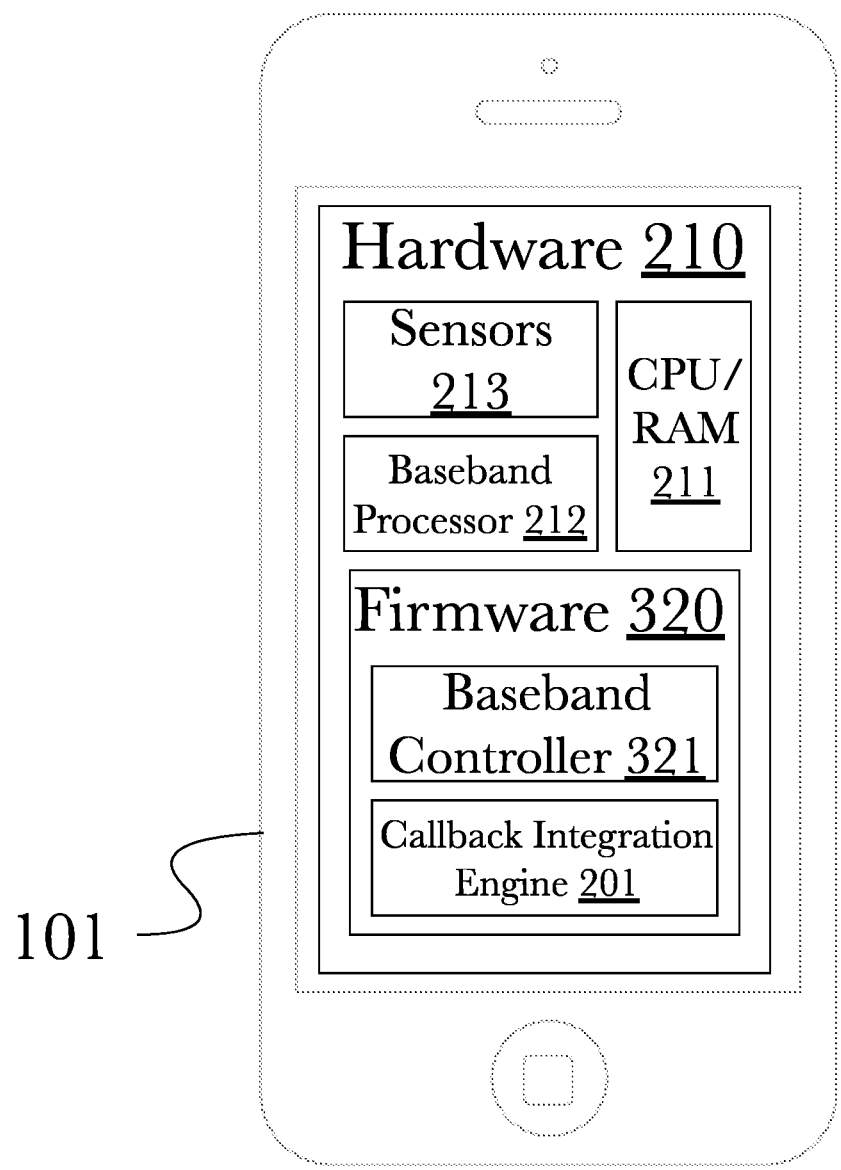
FIG. 3 is a block diagram illustrating an exemplary mobile device with a callback integration engine operating at the device firmware level, according to an embodiment.

FIG. 3 is a block diagram illustrating an exemplary mobile device 101 with a callback integration engine 201 operating at the device firmware level, according to an embodiment. According to the embodiment, a firmware level 320 encompasses low-level program code that operates "below" the operating system 220, operating directly on hardware components of mobile 101, and comprises such features as a baseband controller 321 that controls features of baseband processor 212 and the operation of which is fully transparent to the user (that is, a user of mobile device 101 does not see or interact with firmware, and many users may not even be aware of its existence or capabilities).

According to the embodiment, a callback integration engine 201 may operate as a firmware component that directly interfaces with hardware features of mobile device 101, enabling direct control as needed while exposing desired functionality to the operating system 220 in a transparent manner (that is, the operating system may only know that a feature is available, and may not be able to determine that the feature is provided by the callback integration engine 201 rather than, for example, the baseband controller 321). This enables more direct control over device functions, such as call routing and hardware information such as sensor readings (as may be used in callback workflow processing, as described below in greater detail with reference to FIG. 9), and allows the callback integration engine 201 to intercept incoming calls and radio information before it reaches the operating system, so data may be manipulated and additional features may be integrated prior to presentation to the OS. This also prevents accidental removal of callback integration engine 201, as a user may have no control over device firmware and anything operating at or below the OS level 220 would inherently have insufficient access to modify firmware. This further enables callback integration engine 201 to access hardware features that may be restricted or completely prevented when operating within the OS layer 220, for example hardware sensor or geolocation information that may be incorporated into a callback workflow as described below (with reference to FIGS. 7-9).

Figure 4:
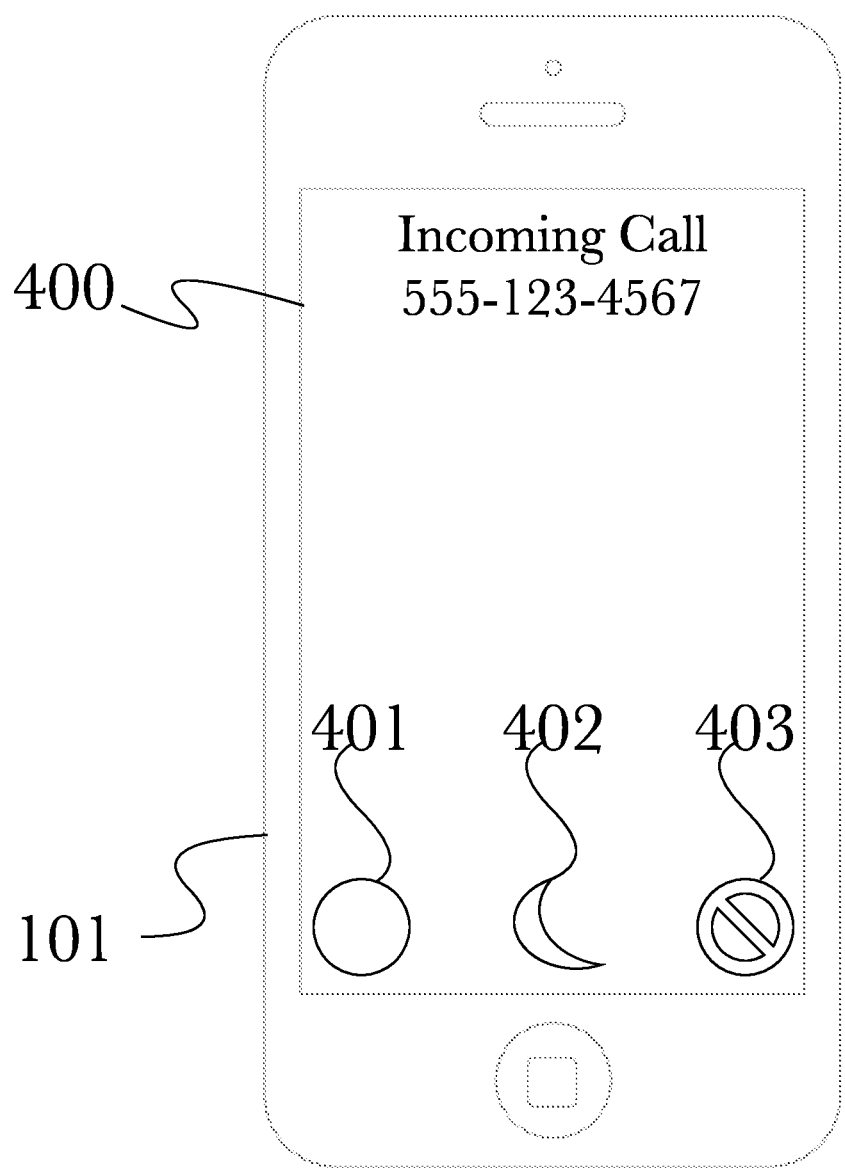
FIG. 4 is a user interface diagram illustrating an exemplary incoming call on a mobile device with integrated callback features, according to an embodiment.

FIG. 4 is a user interface diagram illustrating an exemplary incoming call 400 on a mobile device 101 with integrated callback features, according to an embodiment. According to the embodiment, a mobile device 101 with integrated callback features provided by a callback integration engine 201 may natively incorporate callback functionality into standard functions such as receiving a phone (or voice over Internet protocol, "VoIP") call, email (as described below with reference to FIG. 5), or other functionality. When a call 400 is received, the native answer prompt may present the user with the usual options to answer 401 or decline 403 the call, with normal functionality (generally, either answering the call and starting an interaction, or declining the call and sending it to voicemail or an automated prompt).

Callback integration engine 201 may present an additional prompt to setup a callback 402, either through OS-based software integration with the callback integration engine operating at the OS layer 220, or as a base-level firmware feature that is natively recognized and exposed by the OS while the callback integration engine 201 operates at the firmware level 320. This added option 402 may be used to automatically request or schedule a callback, for example by providing a message to the caller requesting they call back at a predetermined time (for example, based on known availability from a user's on-device calendar), or by engaging with a callback cloud 110 to automatically arrange a callback that connects both participants. Whether or not the callback prompt 402 is presented may be configurable, such as by incorporating trust lists or zones that determine what callers may be eligible for a callback (similar to a "favorite contacts" list that may be able to call the user even when a do-not-disturb feature is enabled), or context-based configuration such as to provide a callback prompt when the user is in a meeting or otherwise scheduled as "busy" in their calendar, or when the user is driving.

Figure 5:
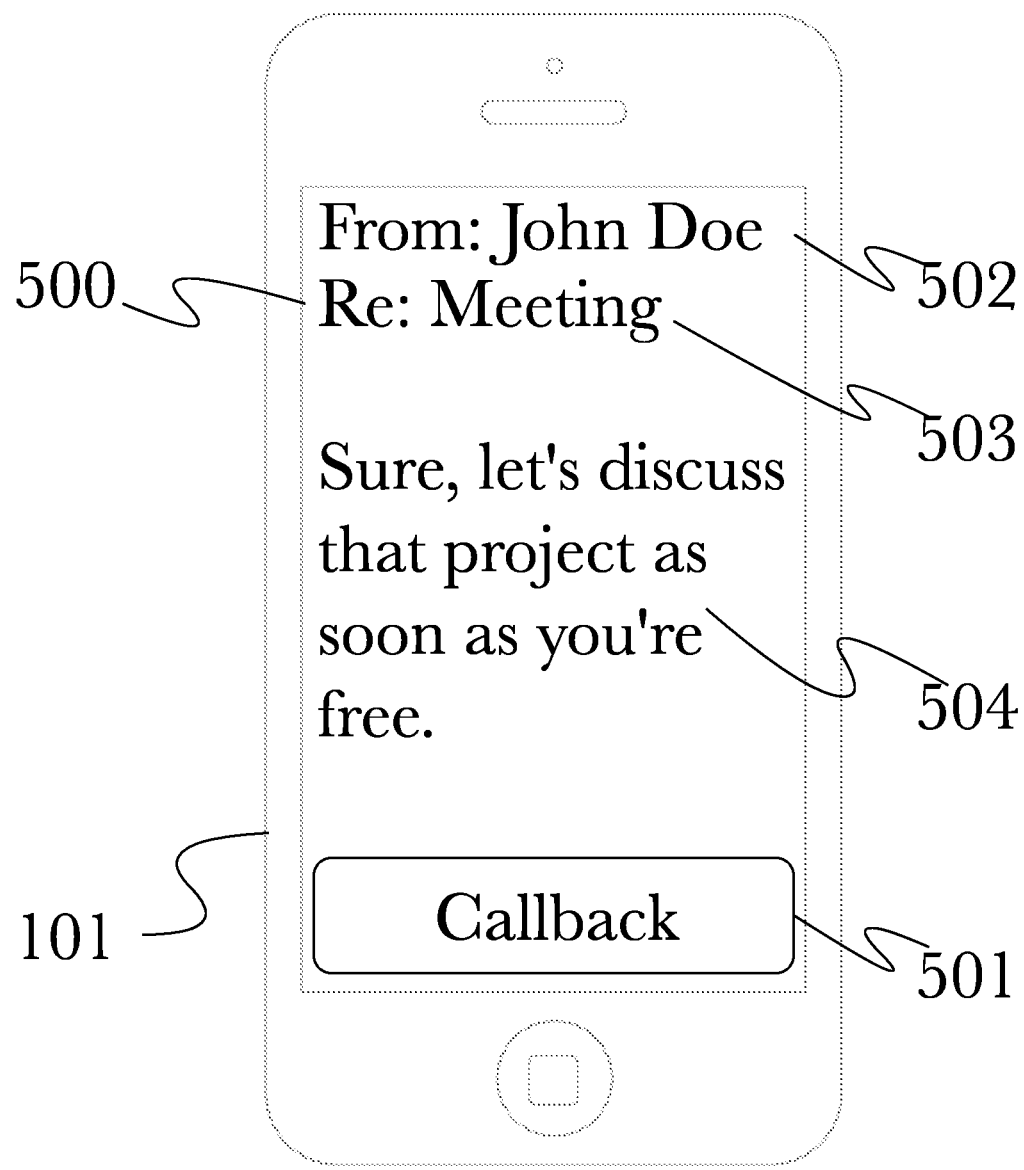
FIG. 5 is a user interface diagram illustrating an exemplary email application operating on a mobile device with integrated callback features, according to an embodiment.

FIG. 5 is a user interface diagram illustrating an exemplary email application 500 operating on a mobile device 101 with integrated callback features, according to an embodiment. According to the embodiment, an email message or contact may be augmented with callback functionality provided by callback integration engine 201, presented as an option 501 to setup an automated callback from within an email application 500. This feature may incorporate information from the current email such as a topic 503, timing 504, or contact information 502, as well as any additional device, context, user, or other information that may be relevant (for example, calendar information or other emails outside the current message or thread), and cause a callback object to be generated. This callback object may then be used to automatically schedule and execute a callback by contacting the participants 502 of the email (and it should be appreciated that this need not be limited to two participants, and may be used to create automated conference calls), and then bridge the individual calls to each participant to complete the interaction by connecting the participants together into a single call.

Callbacks may be scheduled according to a variety of criteria, including (but not limited to) user availability as determined from preconfigured settings or known context (for example, calendar or email information such as invitation responses or verbal commitments in messages that may not have been separately entered into a calendar), user activity based on device information such as network or sensor data (such as if the device is paired to a car audio system, indicating the user is driving, or if there is significant accelerometer data that might indicate the user is in the middle of an exercise activity). Callbacks may then be scheduled to occur when the user is available or no longer indisposed, and may also incorporate availability on the part of the caller by (for example) providing them with a selection of callback options to from which to select a specific callback time. In addition to providing a callback selection on an incoming call prompt, the callback function may be exposed in other areas throughout the device's OS and applications, such as from within voicemail messages (to setup an automated callback with the caller that left the voicemail), social media apps (to setup automated callbacks with other users), or potentially any application operating on the device 201 (such as to setup an automated callback for technical support). This integrated callback operation may be consistent throughout the device's software, providing a native user experience that blends seamlessly with the other features and elements of the device's operating system and applications.

To generate, schedule, and execute callbacks, a callback object is created on the user's device 101 to represent the callback information such as scheduling, context information, user and caller information, and any additional data pertinent to the callback (for example, related interactions such as previous calls or emails exchanged with the caller, or a known call intent based on available information from the user and/or caller, such as email transcripts or voicemail messages). This callback object may be created and maintained on-device, operating locally within the callback integration engine 201 or within an application or feature of the operating system 220 of the user's device 101, enabling full callback functionality regardless of any connection to, or availability of, a callback cloud 110. In other arrangements, callback objects may be cloud-based to provide a centralized or software-as-a-service (SaaS) operation mode, for example to provide tiered or subscription-based callback functionalities offered by a callback cloud through handling of callback objects on behalf of users.

Figure 6:
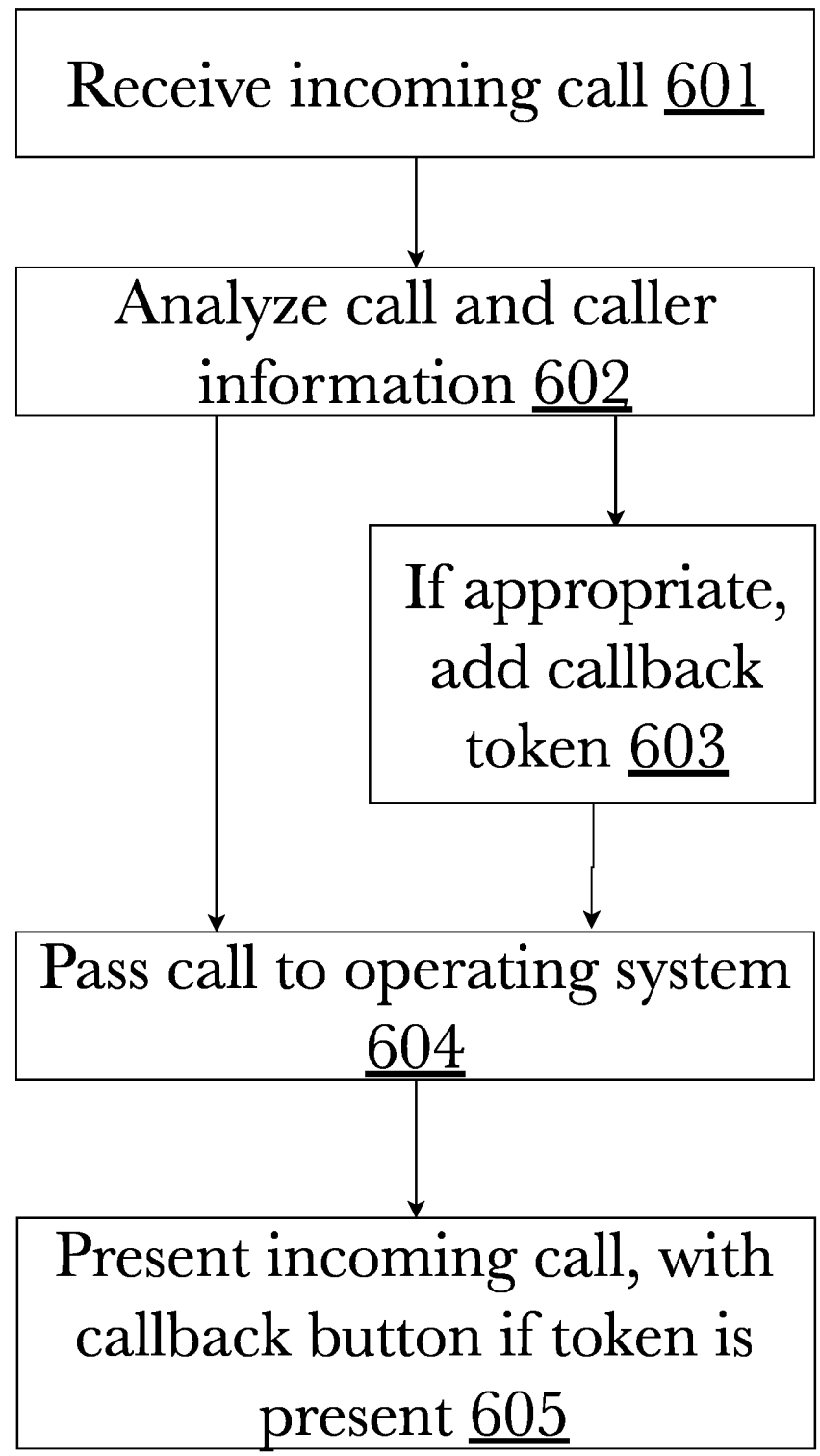
FIG. 6 is a method diagram illustrating an exemplary incoming call flow, according to an embodiment.

FIG. 6 is a method diagram illustrating an exemplary incoming call flow, according to an embodiment. According to the embodiment, a call is received 601 at a mobile device 101. A callback integration engine 201 then analyzes the information available for the call 602, such as (for example, including but not limited to) caller ID, caller and recipient time zones, or whether the caller is a member of a trust zone in the user's settings or contact information (or a trust zone not configured by the user, such as a corporate trust zone for coworkers and colleagues). If the caller is eligible (that is, if they have sufficient trust or if their call is determined to be valuable to the user, such as a call from a technical support number for a company the user recently contacted), a callback token is associated with the call data 603. If the user is untrusted, such as a blocked user or a suspected "spam" number, the call may be passed to the OS layer unmodified 604. When received by the OS layer, the call is then displayed as an incoming notification as usual 605, with a callback token (if available) used to place an additional callback button within the interface using the native OS and call notification user experience (UX) design. This provides an integrated automated callback functionality that is transparently incorporated into device features in a manner consistent with the operating system's UX and familiar to the user, blending the new functionality with the rest of the device features. It should be further appreciated that this mode of operation may function whether the callback integration engine 201 is operating at the firmware 320 or OS 220 level, as many mobile operating systems such as ANDROID™ and IOS™ allow for applications to integrate with communication features such as phone dialers and incoming call notification prompts.

Figure 7:
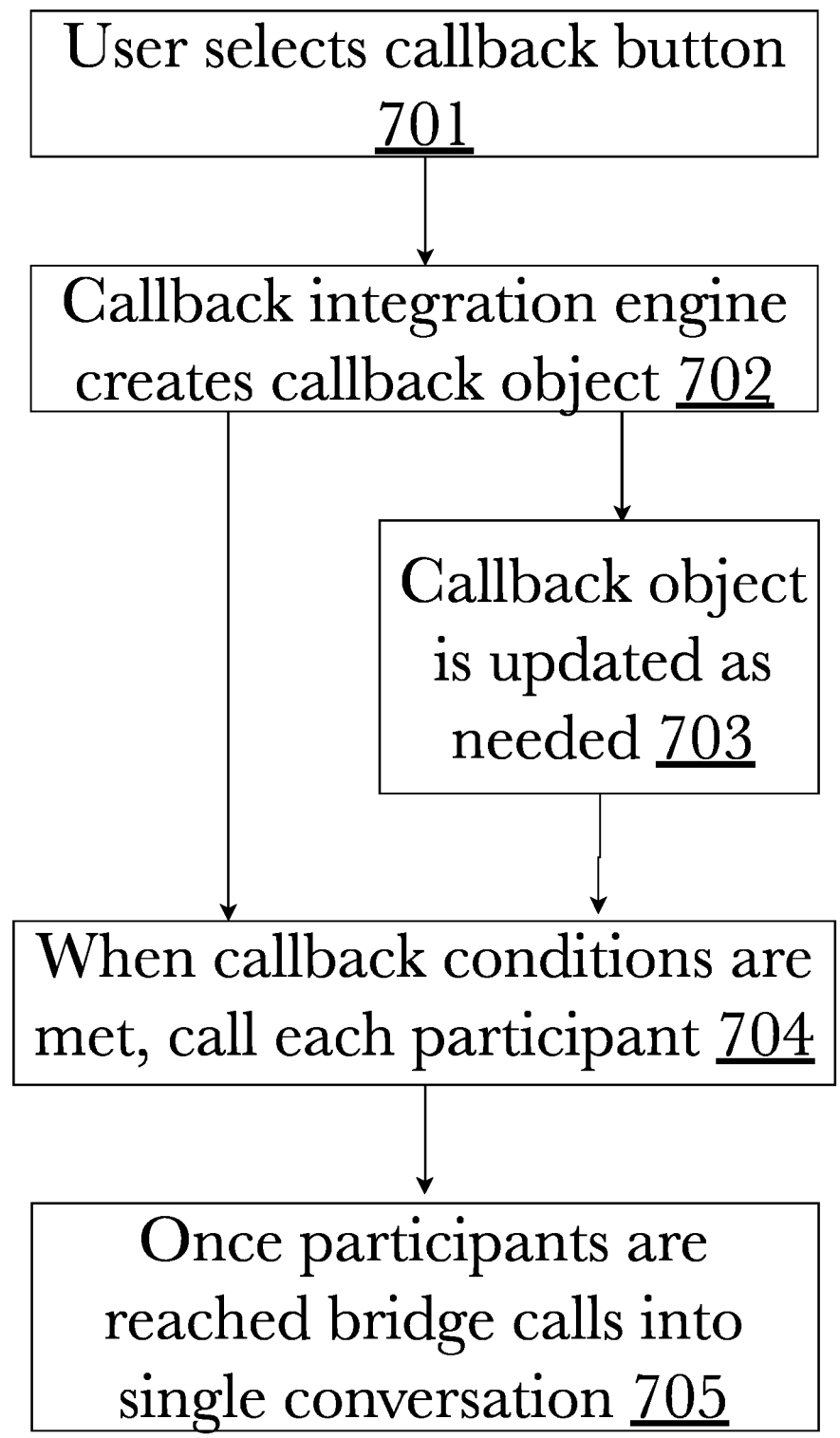
FIG. 7 is a method diagram illustrating an exemplary callback workflow once a user selects a callback for an incoming call, according to an embodiment.

FIG. 7 is a method diagram illustrating an exemplary callback workflow once a user selects a callback for an incoming call, according to an embodiment. Initially, a callback button is selected 701 by the user, either from an incoming call that they wish to defer to an automated callback or from an email for which they wish to automatically setup a callback, or any other interaction, application, or location where an integrated callback button may be present. A callback object is instantiated 702, using a callback integration engine 201, which is an object with data fields representing the various parts of callback data for the user and any other callback participants (for example, the caller if a callback button was pressed on an incoming call notification, or other individuals participating in an email thread if the callback button was pressed from within an email message), and any related information such as what scheduled times may be possible for such a callback to take place. This callback object is then stored and maintained by the callback integration engine 703, updating information when necessary such as to accommodate changes in scheduling or a participant indicating that they will be unavailable during the selected callback time. This may result in modifying the existing callback to reschedule it, and when the conditions for the callback are met (scheduled time arrives, users are available, or any other conditions that may have been set), the callback integration engine 201 initiates a call to each participant 704 and then bridges them into a single call 705 where they may interact. This provides automated connection of multiple individuals as needed, without requiring any participant to initiate the call or remember scheduling information, as the entire process is handled "behind the scenes" by the callback integration engine 201.

Figure 8:
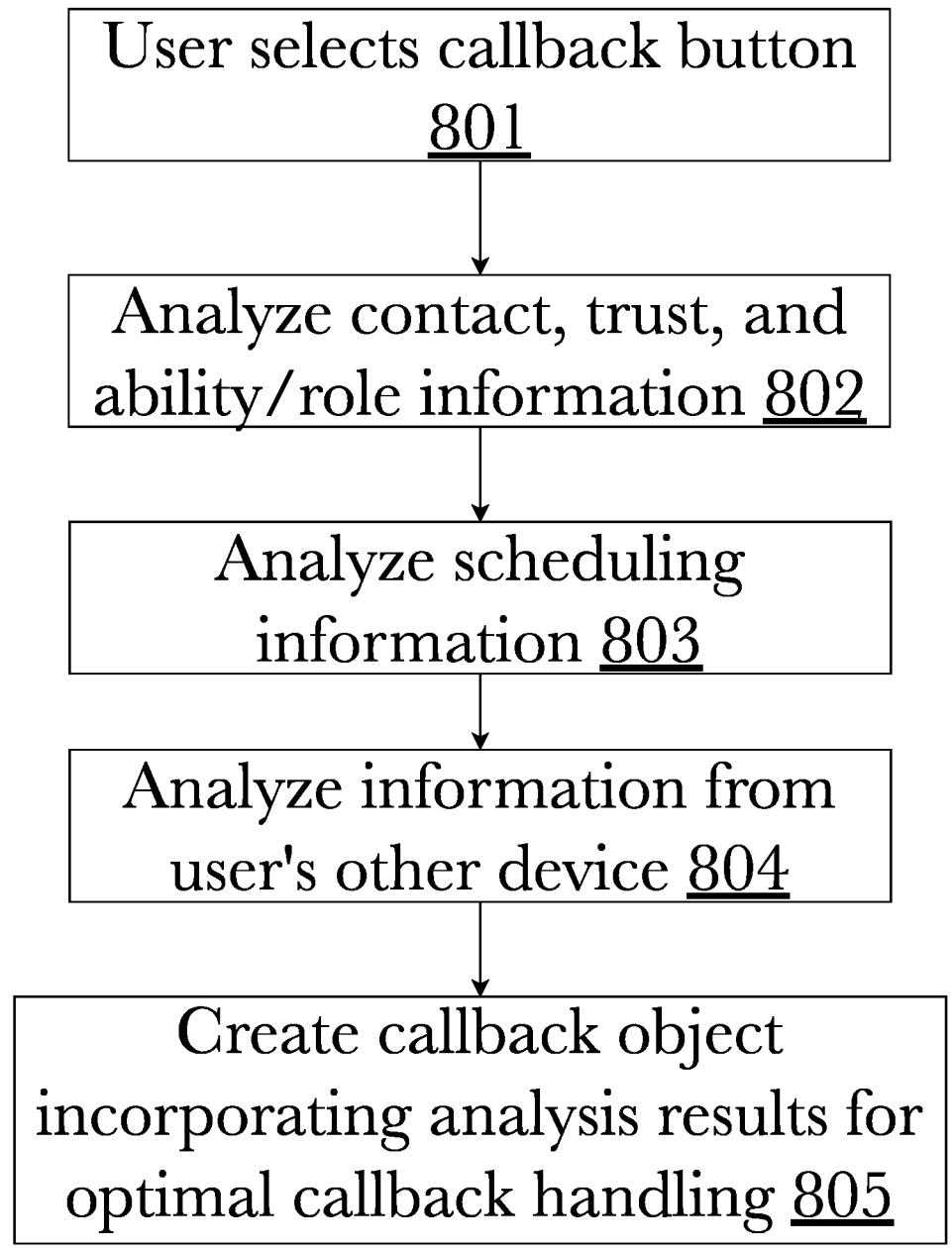
FIG. 8 is a method diagram illustrating an exemplary callback workflow incorporating device context, according to an embodiment.

FIG. 8 is a method diagram illustrating an exemplary callback workflow incorporating device context, according to an embodiment. According to the embodiment, when a user selects a callback button 801, callback integration engine 201 may analyze a variety of information available when determining how to setup the callback being requested. Contact information for each participant may be examined 802, including contact methods (for example, primary or alternative phone numbers, personal or work email addresses, or other communication means) to determine the best methods and numbers to reach participants.

Trust and role information may include determining whether a participant has sufficient trust to be included in the callback (for example, a callback for an email conversation may not necessarily automatically include all email participants, such as to exclude receive-only email addresses that may be included in a conversation for organizational or technical purposes but which would have no place in a call and may interfere with attempts to complete a callback), individual roles or abilities such as skills or organizational departments (for example, a callback for technical support may not include an individual from sales, even if they were present in an email conversation, or a callback for an incoming call from a corporate contact may not necessarily be setup to connect that specific individual with the user and may instead find someone more suitable to address the user's needs), or other information that may be specific to individuals available to participate in a callback.

Additional information may be made available through third-party integrations such as (for example) connecting to a callback cloud 110 to retrieve information about corporate contacts such as technical support or sales, to retrieve estimate wait time (EWT) information for a contact center, or to retrieve business hours for use in scheduling the callback. For example trust information may be determined using public/private key pairs rather than configurable trust zones; in this arrangement, a participant's key may represent their unique identifier within a callback system and be compared against a known public key to determine if the caller is who they claim to be, or if they are permitted to participate in a callback. Keys may be managed and brokered by a third-party service operated by (for example) a callback cloud 110, enabling trust delegation to a centralized entity that operates as a trust broker and can see and manage many users rather than relying on any particular user to maintain complex trust and role information on their own device.

Scheduling information is also checked 803, including the user's calendar or to-do list items to determine their own availability, as well as any available scheduling cues for other callback participants such as business hours, shared calendar events, or information contained in previous interactions (for example, if the two individuals exchanged emails discussing events or timing information).

Additional device information may then be analyzed 804, including information on a user's other devices that may be useful in determining callback conditions. For example, a user may have a chat window active on their computer, wherein they are conversing with a second individual. If the user then clicks or taps on a callback button within an email conversation on their mobile device, the chat on their desktop may be analyzed to provide additional context such as topic or scheduling information that would otherwise not be known to software on the mobile device alone. This can be accomplished in a number of ways according to the particular operating systems and devices involved, for example a shared user account or profile that is logged into multiple devices may provide a connection between callback integration engine 201 and software or data on another device associated with the same account (for example, callback integration engine 201 may be granted remote access to information on another device by providing the user's account credentials). In other arrangements, a network may be used to connect between devices such as over Wi-Fi™ or BLUETOOTH™, for example as is used in APPLE AIRDROP™ or HANDOFF™ functionality to share information between devices running MACOS™ and/or IOS™ operating systems. This enables transparent information sharing between a user's devices, so information on each device may be pooled and analyzed together to ensure the callback integration engine 201 makes the most-informed decision possible.

Finally, once all available context information has been processed, a callback object is created 805 that incorporates the necessary information for the callback (such as topic, participants, and scheduling) and the conditions determined by callback integration engine 201 to be optimum for the callback (such as when all appropriate participants will be available), and is then stored and maintained so the callback can be performed when the selected conditions have been met.

Figure 9:
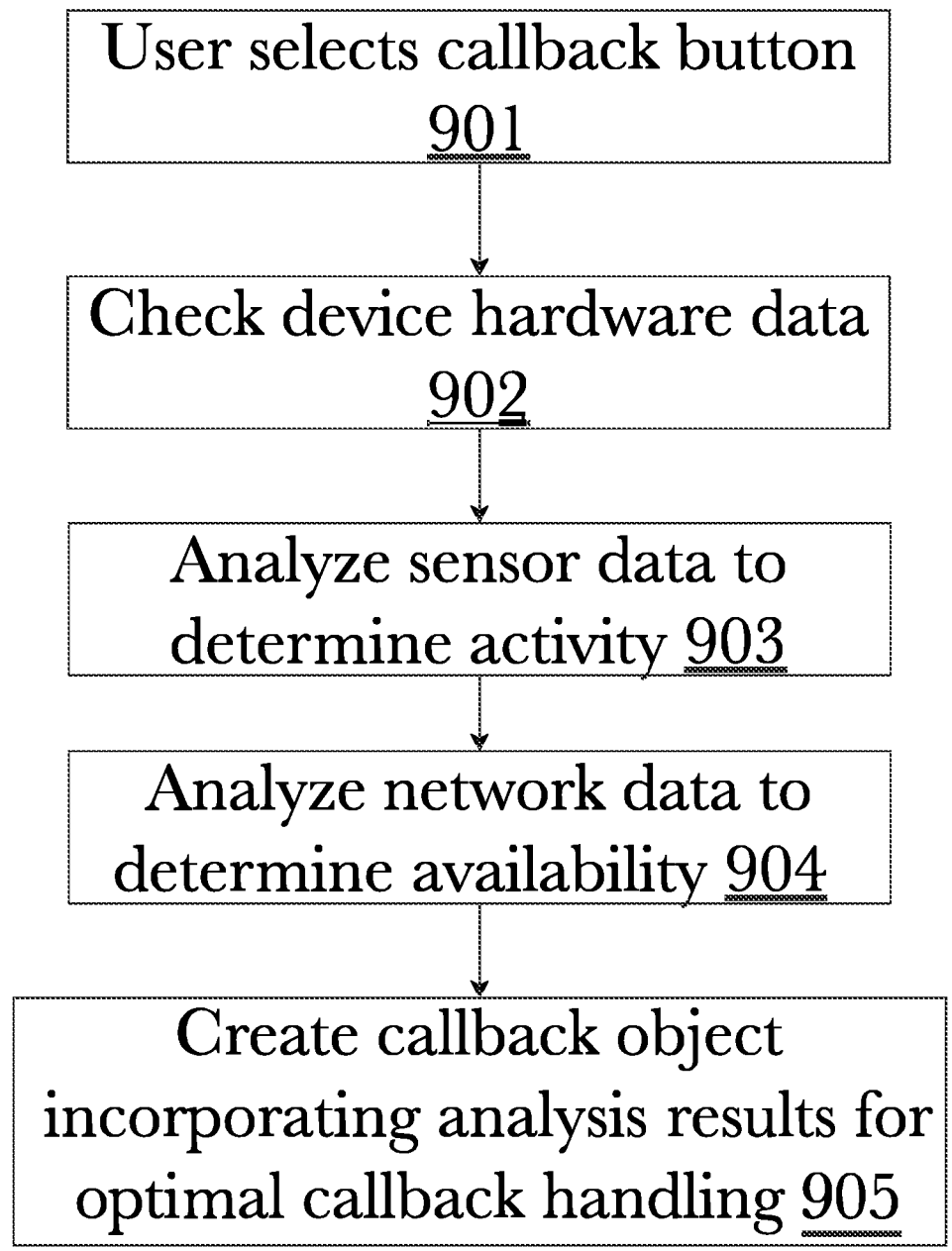
FIG. 9 is a method diagram illustrating an exemplary callback workflow incorporating device hardware information, according to an embodiment.

FIG. 9 is a method diagram illustrating an exemplary callback workflow incorporating device hardware information, according to an embodiment. According to the embodiment, when a user selects a callback button 901, their device hardware information may be analyzed by callback integration engine 201 to assist in determining the optimum conditions for a callback. Hardware information may be examined 902, including identifying any available sensors according to the user's particular mobile device 101, for example an accelerometer, gyroscope, barometer, thermometer, or compass, as well as other device hardware capabilities such as network connections or input/output capabilities and activity. Sensor data may be analyzed 903 to determine current conditions around the user, such as ambient noise levels, movement, or whether the user is currently engaged in any sort of physical activity such as running or working out (and thus unable to take calls until finished). Additionally, hardware components that may not explicitly be identified as "sensors" may be analyzed as well, such as device microphones or speakers (for example, to determine if the user is currently listening to audio content and therefore busy for the duration of the content, or if the user is in a loud environment and thus unable to take a call until they are in a quieter place).

Device network connection information may then be analyzed 904, to determine additional factors such as whether the device is currently connected to a car audio system (indicating that the user is driving and thus unable to take a call until they have reached a safe location and stopped operating the vehicle), whether a user's other devices are nearby for information exchange (as described above, with reference to FIG. 8), or whether any accessory devices are connected that may be used to provide additional information (such as fitness devices connected over BLUETOOTH™ or ANT+™ connections, external GPS devices, connected audio devices such as headphones, or any other accessories). This information may be analyzed to determine what activities the user is currently engaged in, as well as their likely short-term availability (for example, if they are driving, a navigation application may be checked to see if their destination and ETA are known, or if they are engaged in a fitness activity, the anticipated duration may be estimated or determined from available information on the mobile device or connected accessories).

Once all hardware information has been analyzed, a callback object is then created 905 that accommodates the user's current activities and environment to determine a good time to execute the callback, when the user will be available and uninvolved in other activities and when the environment may be more conducive to a call.

Figure 10:
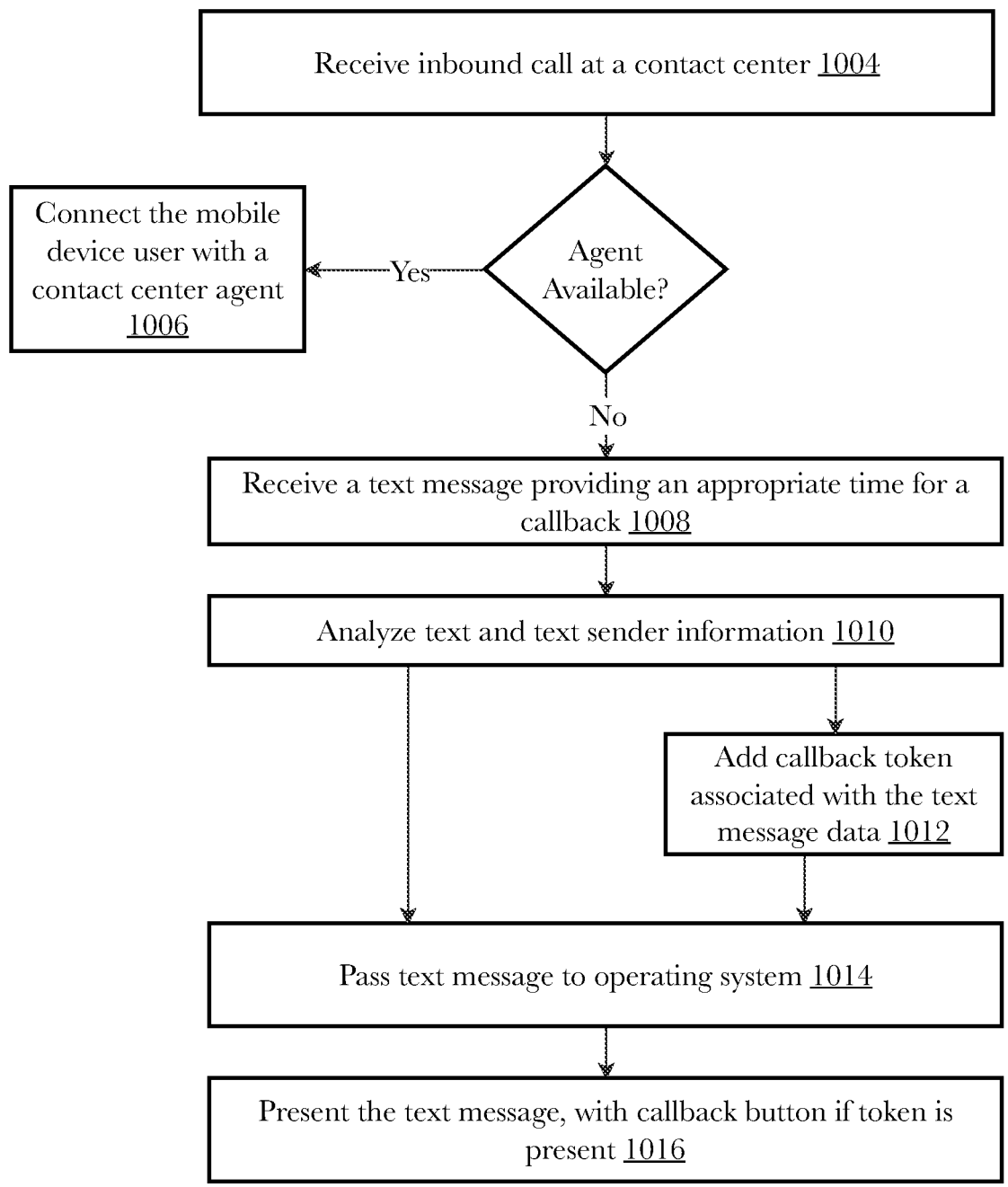
FIG. 10 is a method diagram illustrating an exemplary incoming text message flow, according to an embodiment.

FIG. 10 is a method diagram illustrating an exemplary incoming text message flow, according to an embodiment. According to the embodiment, the process begins when a contact center receives an inbound call 1004 from a mobile device 101 user. The inbound call may be a voice or video call. In some implementations the inbound call may be a text message, instant message, email, or some other means of interacting and communicating with a contact center. If an agent is available then the process proceeds to step 1006 where the mobile device user and agent are connected. If an agent is not available, then the process proceeds to step 1008 wherein, according to the embodiment, a text message is received 1008 at a mobile device 101. In some implementation the text message is received from a call center, which generates and transmits the text message to the mobile device 101. The text message may be sent by a contact center in response to the user of mobile device 101 placing an inbound call (e.g., voice or video call, text message, instant message, email, etc.) to a contact center wherein the user is unable to be connected with an agent. The text message may provide an appropriate time when a callback may occur. In various embodiments, an appropriate time for the mobile device user to place a subsequent call to the contact center or the contact center to place an outbound call to the mobile device user is a time that is generally beneficial to both the contact center and the mobile device user. For example, in certain implementations, an appropriate time may be when the inbound call volume is at a low level for the contact center, when the average wait time is the queue for an available agent is at a minimum threshold, when a minimal number of agents are currently available to handle inbound calls and/or to place outbound calls, and/or when the current utilization of agents is at a minimum threshold.

According to embodiments, the text message sent to the mobile device 101 may contain different information depending on whether the contact center is providing an appropriate time for the mobile device user to place a subsequent inbound call to the contact center or an appropriate time when the contact center can place an outbound call to the mobile device user. For example, if the text message is providing the mobile device user with an appropriate time for a subsequent call to the contact center then the message may inform the calling party to call back the contact center immediately or within some short period of time while the wait time is low or may provide the mobile device user with a time window for when the user should call back the contact center. For instance, if the contact center is monitoring forecasted inbound call volume instead of current average wait time for calls placed in a queue waiting for available agents, then the contact center may determine that the forecasted inbound call volume between 1:30 p.m. and 2:15 p.m. is below a threshold amount. Thus, the contact center may send the mobile device user a text message informing the user to place a subsequent call to the contact center between the hours of 1:30 p.m. and 2:15 p.m.

Additionally, the text message may provide the mobile device user with an option to request another appropriate time for a callback. Furthermore, the text message may include a telephone number for the contact center. The number provided may be a number for a specific agent so that the mobile device user is immediately connected with an agent or may be a general number used for inbound calls. In some implementations, the telephone number provided in the text message may only be valid during the appropriate time indicated in the text message. The contact center may also include additional information in the text message sent to the mobile device 101. For example, in some implementations, the contact center may customize the message based on the reason the mobile device user initially called or otherwise contacted the contact center. For example, if the inbound call was placed by the mobile device user to make a payment on an account, the text message may include information (e.g., a link) on a website the user can visit to make the payment instead. It should be appreciated that the above described information may be sent on a single text message, but that more than one text message may be utilized in order to provide such information.

A callback integration engine 201 then analyzes the information available for the text message 1010 such as (for example, including but not limited to) caller ID, texter and recipient time zones, or whether the texter is a member of a trust zone in the user's settings or contact information (or a trust zone not configured by the user, such as a corporate trust zone for coworkers and colleagues). If the caller is eligible, a callback token is associated with text message data 1012. If the user is untrusted, such as a blocked user or suspected "spam" number, the text message may be passed to the OS layer unmodified 1014. When received by the OS layer, the text messages is then displayed as an incoming notification as usual 1016, with a callback token (if available) used to place an additional callback button within the interface using the native OS and text notification user experience (UX) design. This provides an integrated automated callback functionality that is transparently incorporated into device features in a manner consistent with the operating system's UX and familiar to the user, blending the new functionality with the rest of the device features. It should be further appreciated that this mode of operation may function whether the callback integration engine 201 is operating at the firmware 320 or OS 220 level, as many mobile operating systems such as ANDROID™ and IOS™ allow for applications to integrate with communication features such as phone dialers and incoming call notification prompts. If/when the user chooses to select the callback button, the mobile device user and a contact center agent may be connected according to the method described above in FIG. 7.

Figure 11:
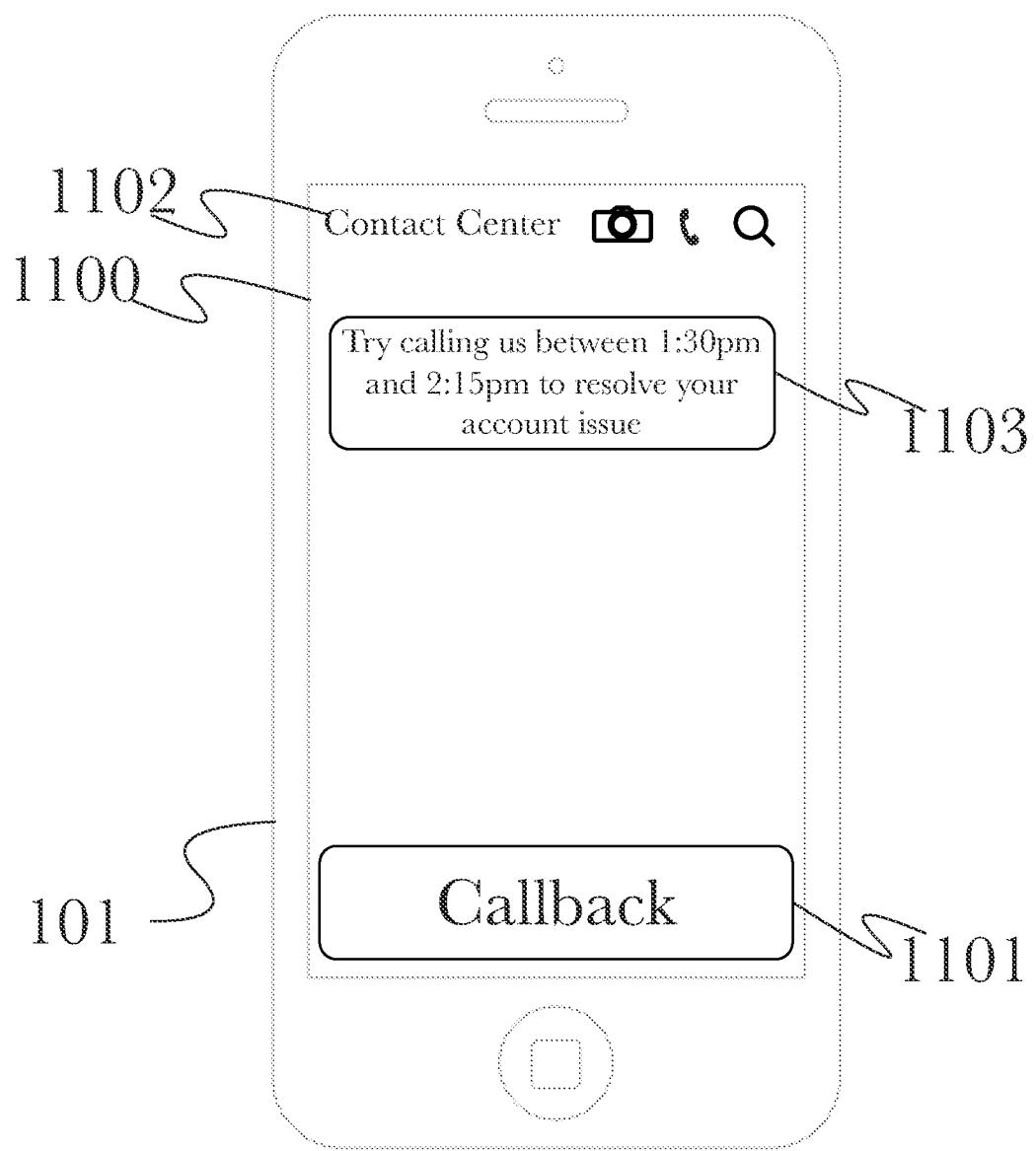
FIG. 11 is a user interface diagram illustrating an exemplary text messaging application operating on a mobile device with integrated callback features, according to an embodiment.

FIG. 11 is a user interface diagram illustrating an exemplary text messaging application 1100 operating on a mobile device 101 with integrated callback features, according to an embodiment. According to the embodiment, a text message or contact may be augmented with callback functionality provided by callback integration engine 201, presented as an option 1101 to setup an automated callback from within a text messaging application 1100. This feature may incorporate information from the current text message such as a topic and/or timing 1103, or contact information 1102, as well as any additional device, context, user, or other information that may be relevant (for example, calendar information or other emails outside the current message or thread), and cause a callback object to be generated. This callback object may then be used to automatically schedule and execute a callback by contacting the participants of the text message (and it should be appreciated that this need not be limited to two participants, and may be used to create automated conference calls), and then bridge the individual calls to each participant to complete the interaction by connecting the participants together into a single call.

Callbacks may be scheduled according to a variety of criteria, including (but not limited to) user availability as determined from preconfigured settings or known context (for example, calendar or email information such as invitation responses or verbal commitments in messages that may not have been separately entered into a calendar), user activity based on device information such as network or sensor data (such as if the device is paired to a car audio system, indicating the user is driving, or if there is significant accelerometer data that might indicate the user is in the middle of an exercise activity). In some implementations, the text message received at the mobile device 101 may comprise a suggested appropriate time for the mobile device user to make a subsequent inbound call or an appropriate time when the mobile device user can anticipate to receive an outbound call from the contact center. Callbacks may then be scheduled to occur when the user is available or no longer indisposed, and may also incorporate availability on the part of the caller by (for example) providing them with a selection of callback options to from which to select a specific callback time. In addition to providing a callback selection on an incoming call prompt, the callback function may be exposed in other areas throughout the device's OS and applications, such as from within voicemail messages (to setup an automated callback with the caller that left the voicemail), social media apps (to setup automated callbacks with other users), or potentially any application operating on the device 201 (such as to setup an automated callback for technical support). This integrated callback operation may be consistent throughout the device's software, providing a native user experience that blends seamlessly with the other features and elements of the device's operating system and applications.

To generate, schedule, and execute callbacks, a callback object is created on the user's device 101 to represent the callback information such as scheduling, context information, user and caller information, and any additional data pertinent to the callback (for example, related interactions such as previous calls or texts exchanged with the caller, or a known call intent based on available information from the user and/or caller, such as text transcripts or voicemail messages). This callback object may be created and maintained on-device, operating locally within the callback integration engine 201 or within an application or feature of the operating system 220 of the user's device 101, enabling full callback functionality regardless of any connection to, or availability of, a callback cloud 110. In other arrangements, callback objects may be cloud-based to provide a centralized or software-as-a-service (SaaS) operation mode, for example to provide tiered or subscription-based callback functionalities offered by a callback cloud through handling of callback objects on behalf of users.

Figure 12:
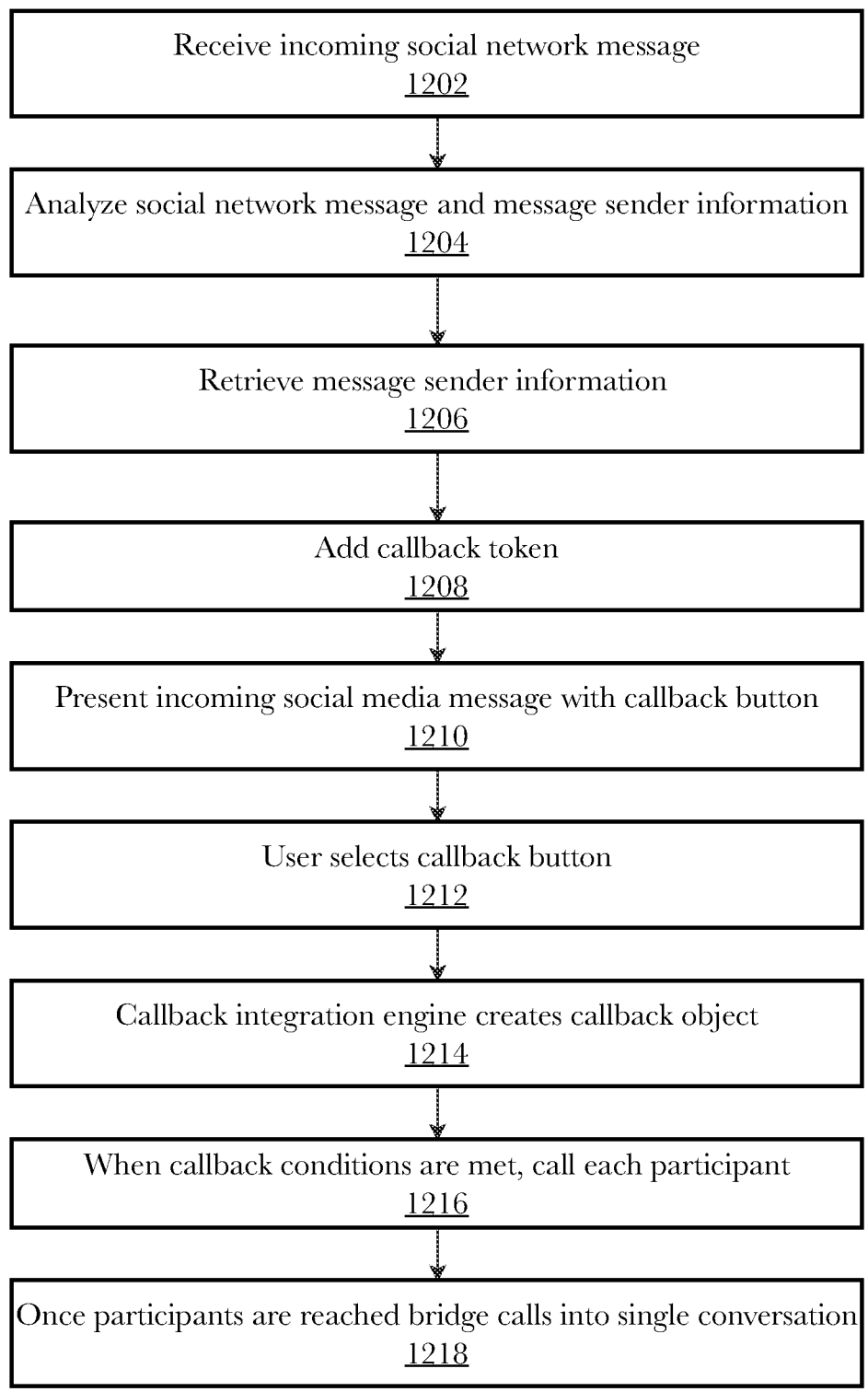
FIG. 12 is a flow diagram illustrating an exemplary method for triggering a callback request from a social network application, according to an embodiment.

FIG. 12 is a flow diagram illustrating an exemplary method for triggering a callback request from a social network application, according to an embodiment. According to the embodiment, a social network message is received 1202 at a mobile device 101 via a social network application stored and operating on the mobile device 101. The social network message may be a private direct message sent to mobile device user, a public message posted on mobile device user's social network home page, a group message wherein the mobile device user is a member of the group, an attempted voice or video chat via social network tools, and/or the like. A callback integration engine 201 then analyzes the information available for the social network message 1204 such as (for example, including but not limited to) sender and recipient time zones, sender and recipient social relationships, or whether the message sender is a member of a trust zone in the user's settings or contact information. Additional information about the message sender may be retrieved 1206 from the social network server by directly querying for information related to the message sender. Such information may include a telephone number and or relationship information associated with the message sender and user of the mobile device 101. For example, a social network server may be utilized to match a user identity or profile with an identifier, such as a phone number. If the message sender is eligible, a callback token is associated with the social network message data 1208 and the social network message is then displayed as an incoming notification as usual 1210, with a callback token used to place an additional callback button within the interface using the native OS and social network notification experience (UX) design. This provides an integrated automated callback functionality that is transparently incorporated into device features in a manner consistent with the operating system's UX and familiar to the user, blending the new functionality with the rest of the device features. It should be further appreciated that this mode of operation may function whether the callback integration engine 201 is operating at the firmware 320 or OS 220 level, as many mobile operating systems such as ANDROID™ and IOS™ allow for applications to integrate with communication features such as phone dialers and incoming call notification prompts. If/when the user chooses to select the callback button 1212 as it is displayed in the social network application, the mobile device user and the social media message sender may be connected according to the method described above in FIG. 7. Specifically, when a user selects the callback button, callback integration engine creates a callback object 1214 which can store associated callback data (e.g., callee and caller information such as phone numbers, scheduling information, etc.) within the callback object. When callback conditions are met, as determined by callback integration engine, then each participant can be called 1216 and once both participants have been reached, in other words each participant has been established as a connected, then the calls may be bridged into a single conversation at 1218.

Figure 13:
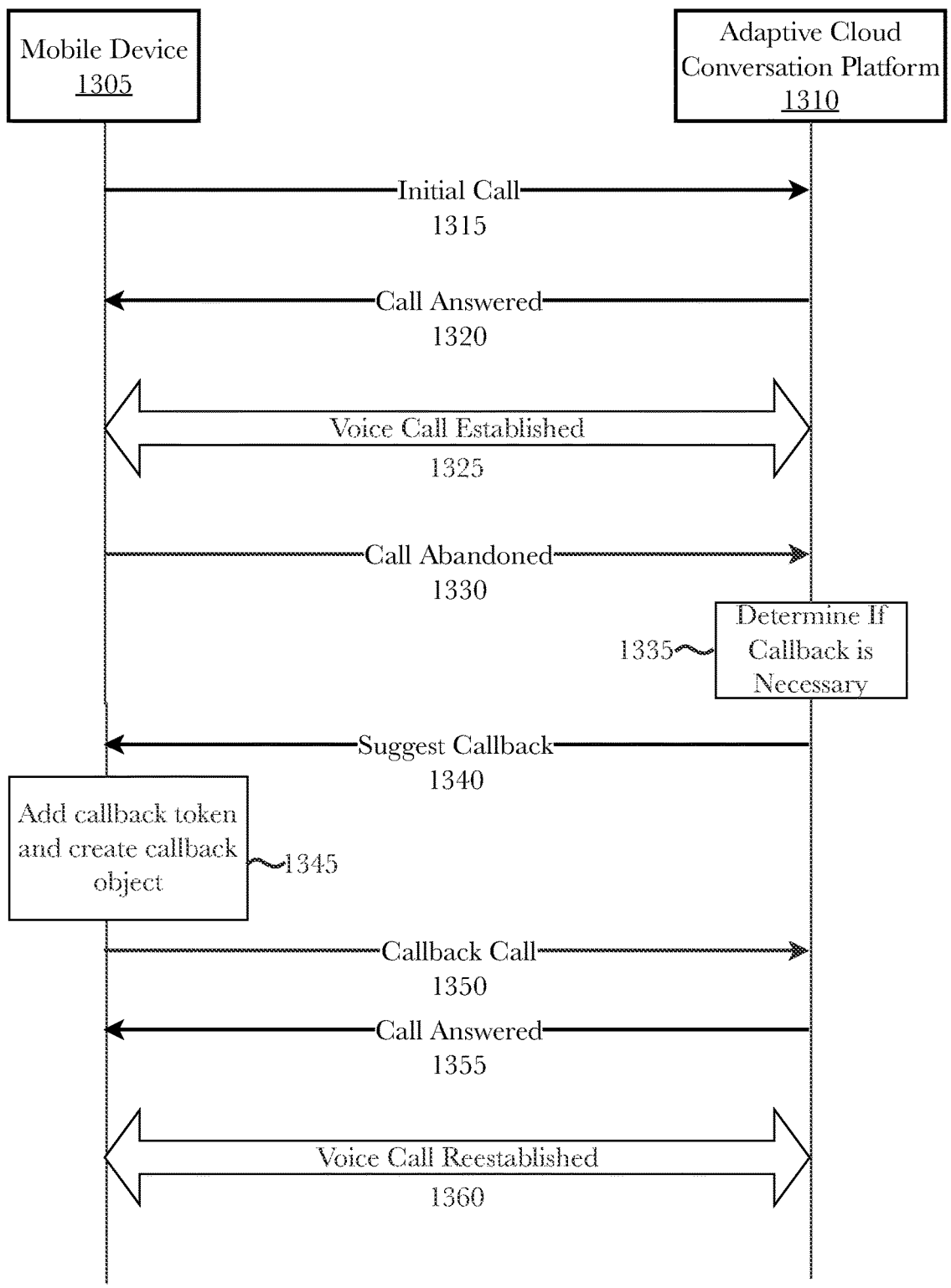
FIG. 13 is an exemplary message flow diagram between a mobile device user and an adaptive cloud conversation platform.

FIG. 13 is an exemplary message flow diagram between a mobile device 101 user 1305 and an adaptive cloud conversation platform 1310. The adaptive cloud conversation platform ("ACCP") 1310 is designed to provide automated, machine-learning-algorithm-supported complex conversation support to brands to establish, enhance, and maintain relationships with their consumers. Its capabilities exceed those of traditional callback systems or customer relationship management systems in that it is designed not just to keep records of past interactions between a given brand and a given consumer and schedule callbacks from the brand to the consumer, but to manage the entirety of complex conversations that may occur between consumers and brands, including conversations involving multiple consumers and multiple brands. For more information regarding the operation and functionality of adaptive cloud conversation platform 1310 please refer to the pending U.S. patent application Ser. No. 17/895,651, the entirety of which is incorporated herein by reference.

The process begins when a mobile device user 1305 (e.g., calling party) calls 1315 a contact center that is operating an adaptive cloud conversation platform 1310. The call is then answered in operation 1320. Any of the well-known telephony signaling protocols may be used to establish the voice call. A voice connection is then established 1325. The calling party may then be presented with a "hold message" by the contact center indicating that an agent is presently unavailable. Or, the calling party may be interacting with an IVR menu provided by an IVR unit, which are also well-known in the industry. The IVR menu can play an announcement and collect a response, typically either in the form of a dual tone multiple frequency ("DTMF") signal or voice response. The menu of options is then navigated by the calling party as they deem appropriate. During this process, the IVR unit may be retrieving caller information from various information systems based on any automatic number information ("ANI") communication in the initial call 1315.

At some point during the call, the calling party abandons the incoming call 1330. The reason they may abandon may vary. The calling party may have grown impatient waiting in a hold queue or may have been frustrated navigating the IVR menu. For example, some IVR menus may require the caller to enter information they may not readily have. The caller may not know how to respond and may hang-up during the call. Because the adaptive cloud conversation platform 1310 is not informed why the calling party abandoned the call, the contact center may use other information to aid in deciding whether the callback should occur. Thus, it is possible that the abandoned call callback process may be invoked when the calling party accidentally abandoned the call, dialed a wrong number, changed their mind, or realized they did not need to originate the call in the first place. However, the ACCP 1310 may determine from other information that the caller likely had a need to communicate, but was not willing to wait on hold.

At step 1335 the ACCP 1310 makes a determination about whether a callback needs to occur or not. The determination in step 1335 represents various tests that are carried out to determine whether an abandoned call requires a callback. In some implementations, the tests used by ACCP 1310 to determine if a callback should occur can include, but are not limited to: determination of whether the calling party's telephone number is available; determination of whether a hold time threshold has been exceeded (this reflects how long the caller has been in a hold queue); determination of whether the calling party abandoned the call in an IVR menu and at what point in the IVR menu; determination if there is a pending callback process associated with the calling party; determination of whether the call originated from a wireless or wireline number; and determining the nature of the callback call (e.g., informational, telemarketing, customer service, etc.). Based on these tests and more, ACCP 1310 can determine if a callback should occur and if the determination is that a callback should occur, ACCP 1310 can send a message which suggests a callback 1340 to the mobile device 1305. The message may be in the form of an email, text message, instant message, chatbox message, voice or video call, and/or the like.

The mobile device 1305 can receive the suggested callback message from ACCP 1310. Then a callback integration engine 201 can analyze the message data, add a callback token to be displayed in the native application operating on mobile device 1305 with which the suggested callback message was received, and create a callback object comprising callback information associated with mobile device user and the callback recipient at step 1345. For example, if the suggested callback message was sent via email, then an interactive callback button may be displayed in the email application which when selected by the mobile device user causes the callback integration engine 201 to create a callback object and connect the two or more parties when certain callback criteria have been met. At process 1350 the mobile device user selects the callback button and a callback call is placed between the mobile device 1305 and contact center via ACCP 1310, wherein the call is answered 1355 and callback integration engine 201 reestablishes the voice call 1360 and connects the two or more parties.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 14:
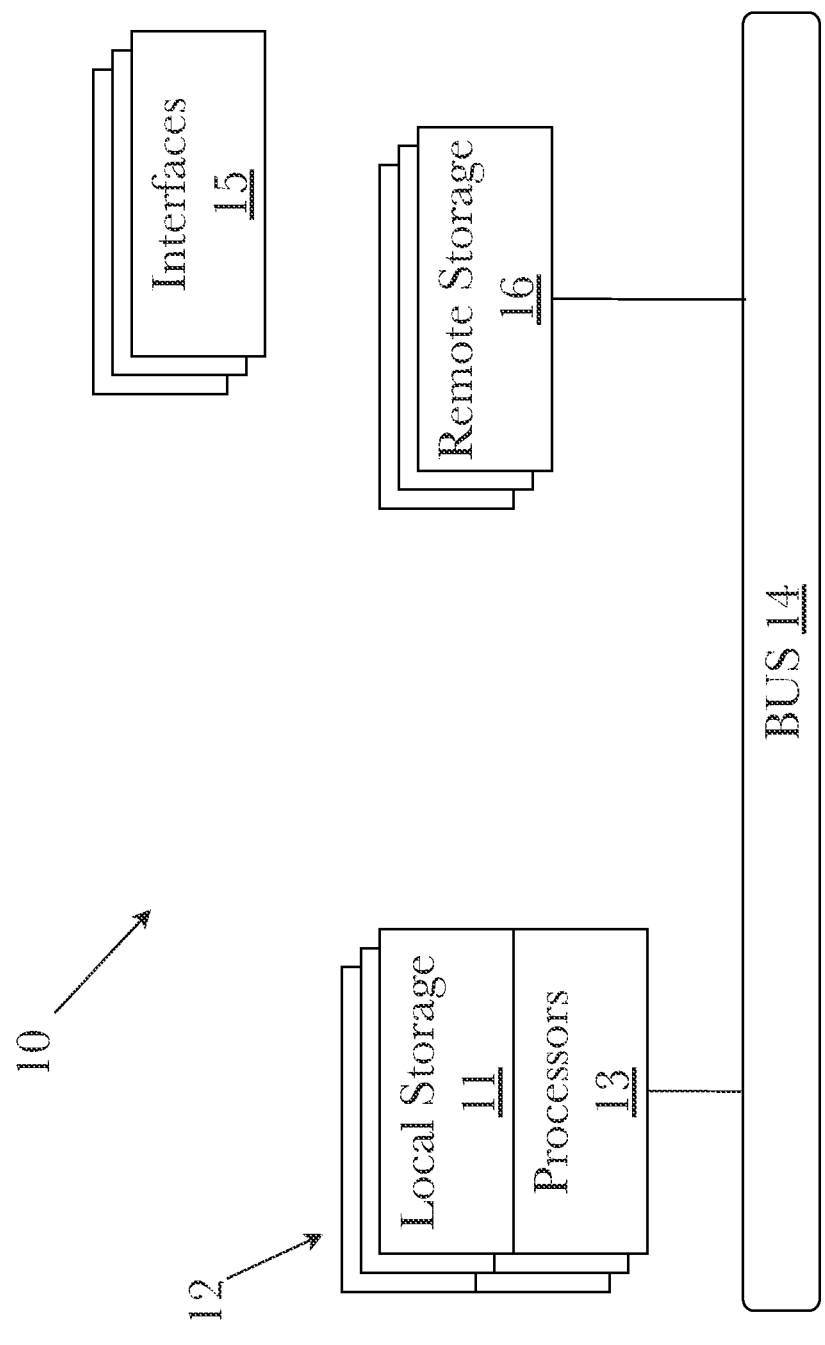
FIG. 14 is a block diagram illustrating an exemplary hardware architecture of a computing device.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 14 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
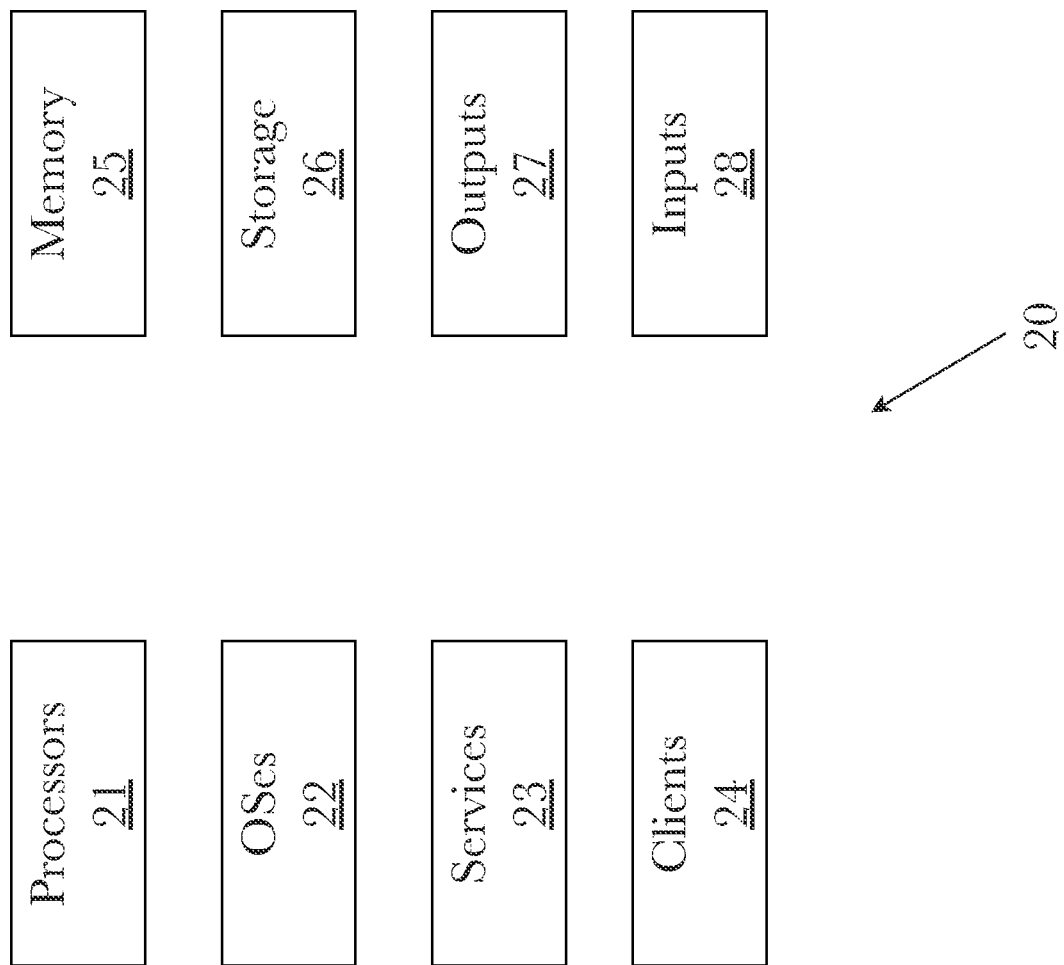
FIG. 15 is a block diagram illustrating an exemplary logical architecture for a client device.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 14). Examples of storage devices 26 include flash memory, magnetic hard drive, CD-ROM, and/or the like.

Figure 16:
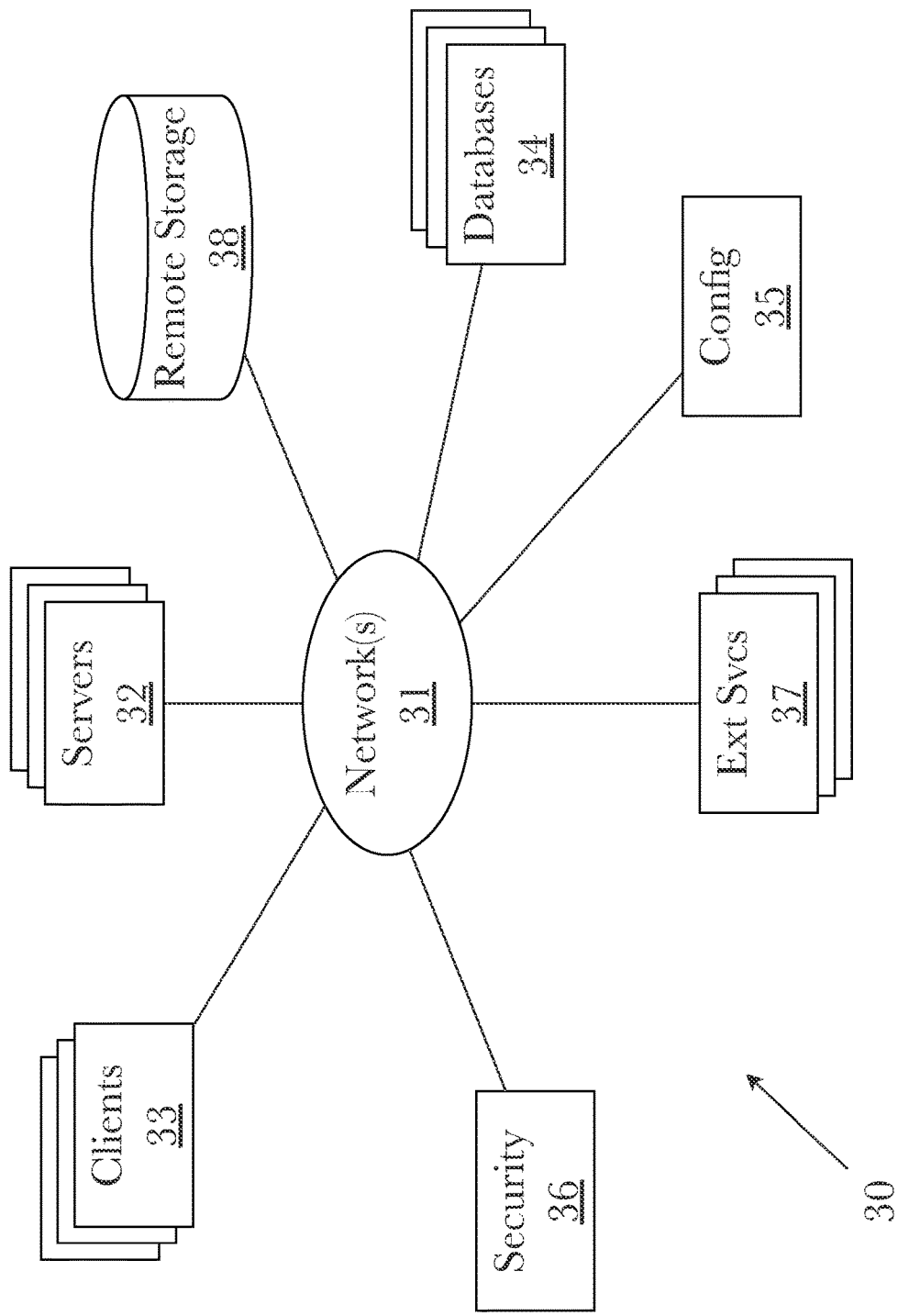
FIG. 16 is a block diagram showing an exemplary architectural arrangement of clients, servers, and external services.

In some embodiments, systems of the present invention may be implemented on a distributed computing network, such as one having any number of clients and/or servers. Referring now to FIG. 16, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 15. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 17:
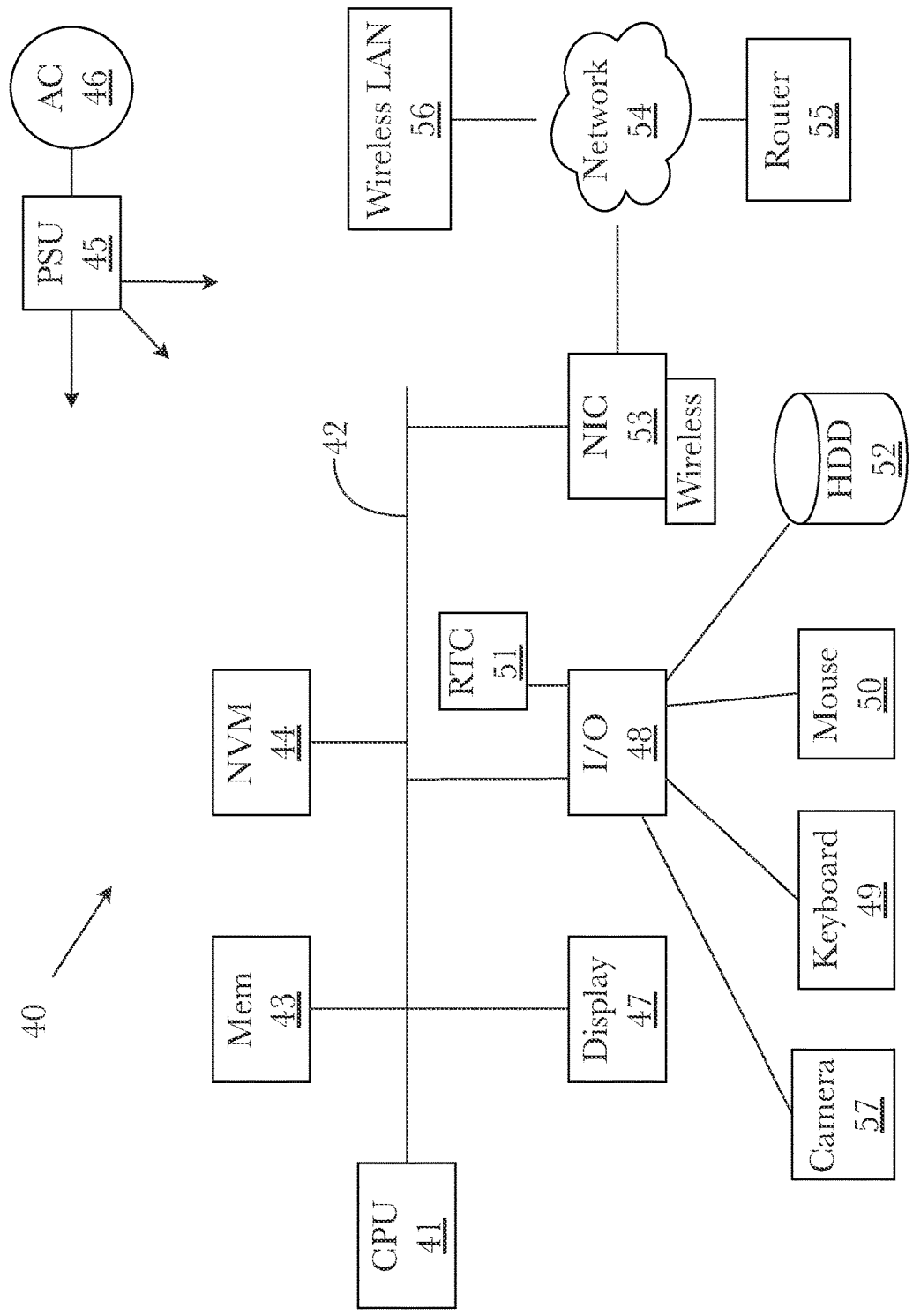
FIG. 17 is another block diagram illustrating an exemplary hardware architecture of a computing device.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A mobile device with active callback integration, comprising:
a processor, a memory, and a plurality of programming instructions stored in the memory and operable on the processor; and
a callback integration engine comprising a subset of the plurality of programming instructions that, when operating on the processor, cause the processor to:
provide a callback token representing an interactive indicia configured for presentation throughout an operating system of the mobile device;
receive interaction from a user via the callback token;
produce a callback object, the callback object comprising information associated with the callback token;
call a callback participant based on the callback object;
present an incoming call prompt to the user; and
connect the user and another device, when both the user and the callback participant answer their respective incoming call prompts.

2. The mobile device of claim 1, wherein the callback integration engine is further configured to:
receive a text message from a contact center, the text message comprising an appropriate time for a callback; and
wherein the callback object is produced comprising the appropriate time for the callback.

3. The mobile device of claim 1, wherein the callback integration engine is further configured to:
receive a callback request from a social network application; and
wherein the callback object is produced comprising information retrieved from a social network server.

4. The mobile device of claim 1, wherein the callback integration engine is further configured to:
receive, from an adaptive cloud conversation platform, a suggested callback message when a user of the mobile device abandons a call; and
wherein the callback object is produced comprising information associated with the suggested callback message.

5. The mobile device of claim 1, wherein the callback integration engine selects the callback participant based on trust information, the trust information comprising an indication of whether the callback participant is trusted by the user.

6. A method for mobile device active callback integration, comprising the steps of:
providing, using a callback integration engine operating on a computing device, a callback token representing an interactive indicia for presentation throughout a software operating system;
receiving interaction from a user via the callback token;
producing a callback object comprising information associated with the callback token;
calling a callback participant based on the callback object;
presenting an incoming call prompt to the user; and
connecting the user and another device, when both the user and the callback participant answer their respective incoming call prompts.

7. The method of claim 6, further comprising the steps of:
receiving a text message from a contact center, the text message comprising an appropriate time for a callback; and
wherein the callback object is produced comprising the appropriate time for the callback.

8. The method of claim 6, further comprising the steps of:
receiving a callback request from a social network application; and
wherein the callback object is produced comprising information retrieved from a social network server.

9. The method of claim 6, further comprising the steps of:
receiving, from an adaptive cloud conversation platform, a suggested callback message when a user of the mobile device abandons a call; and
wherein the callback object is produced comprising information associated with the suggested callback message.

10. The method of claim 6, wherein the callback integration engine selects the callback participant based on trust information, the trust information comprising an indication of whether the callback participant is trusted by the user.

11. A mobile device with active callback integration, comprising:

a processor, a memory, and a plurality of programming instructions stored in the memory and operable on the processor; and a callback integration engine comprising a subset of the plurality of programming instructions that, when operating on the processor, cause the processor to:

receive an incoming call from a caller at the mobile device;

produce a callback token;

provide the incoming call and callback token to an operating system of the mobile device for presentation to a user as a first incoming call prompt;

receive interaction from the user via the callback token; and transmit a notification to the caller, the notification comprising instructions for a callback.

12. The mobile device of claim 11, wherein the callback integration engine analyzes available information about the caller, and the callback token is produced based on the results of the analysis.

13. The mobile device of claim 11, wherein the callback integration engine analyzes the user's calendar, and wherein the callback instructions are based on the results of the analysis.

14. The mobile of claim 11, wherein the callback integration engine analyzes hardware information of the computing device, and wherein the callback instructions are based on the results of the analysis.

* * * * *